US011872171B2

(12) United States Patent
Löcker

(10) Patent No.: US 11,872,171 B2
(45) Date of Patent: Jan. 16, 2024

(54) DEVICE FOR SUPPORTING THE ABILITY OF A PERSON WITH RESTRICTED MOBILITY TO MOVE

(71) Applicant: ASP GmbH, Attendorn (DE)

(72) Inventor: Stefan Löcker, Finnentrop (DE)

(73) Assignee: ASP GmbH, Attendorn (DE)

( * ) Notice: Subject to any disclaimer, the term of this patent is extended or adjusted under 35 U.S.C. 154(b) by 277 days.

(21) Appl. No.: 17/274,825

(22) PCT Filed: Sep. 9, 2019

(86) PCT No.: PCT/EP2019/073983

§ 371 (c)(1),
(2) Date: Mar. 10, 2021

(87) PCT Pub. No.: WO2020/053143

PCT Pub. Date: Mar. 19, 2020

(65) Prior Publication Data

US 2022/0047440 A1 Feb. 17, 2022

(30) Foreign Application Priority Data

Sep. 12, 2018 (DE) ..................... 10 2018 215 479.1

(51) Int. Cl.
*A61G 7/10* (2006.01)
*A61H 3/04* (2006.01)

(52) U.S. Cl.
CPC ......... *A61G 7/1019* (2013.01); *A61G 7/1046* (2013.01); *A61G 7/1086* (2013.01); *A61G 7/1088* (2013.01); *A61G 7/1092* (2013.01); *A61H 3/04* (2013.01); *A61H 2003/043* (2013.01); *A61H 2003/046* (2013.01); *A61H 2201/0192* (2013.01); *A61H 2201/1604* (2013.01); *A61H 2201/1623* (2013.01); *A61H 2201/1635* (2013.01); *A61H 2201/5023* (2013.01); *A61H 2201/5043* (2013.01)

(58) Field of Classification Search
CPC ................ A61H 3/04; A61H 2003/043; A61H 2003/046
See application file for complete search history.

(56) References Cited

U.S. PATENT DOCUMENTS 3,998,284 A * 12/1976 James .................. A61G 7/1046 177/144
4,249,774 A 2/1981 Andreasson
4,334,330 A 6/1982 Marshall
5,060,967 A * 10/1991 Hulterstrum ............. A61G 5/08 297/331

(Continued)

FOREIGN PATENT DOCUMENTS

CN 1666728 A 9/2005
CN 202554296 U 11/2012

(Continued)

OTHER PUBLICATIONS

U.S. Appl. No. 17/274,811, filed Mar. 10, 2021, Stefan Löcker.

*Primary Examiner* — Erez Gurari
(74) *Attorney, Agent, or Firm* — Smartpat PLC

(57) ABSTRACT

A device (1) that supports the mobility of a person with restricted mobility comprises a trolley (3) and a mast (4) attached to the trolley (3). The mast (4) comprises a backrest (6) and armrests (5) for receiving the person.

17 Claims, 6 Drawing Sheets

(56) References Cited

U.S. PATENT DOCUMENTS

| | | | | |
|---|---|---|---|---|
| 5,279,180 | A * | 1/1994 | Henriksson | B60T 7/10 74/489 |
| 5,964,473 | A * | 10/1999 | Degonda | A61G 5/1089 280/755 |
| 6,783,179 | B2 | 8/2004 | Komura et al. | |
| 6,832,770 | B1 * | 12/2004 | Wright-Ott | A61H 3/04 280/87.051 |
| 7,716,759 | B2 * | 5/2010 | Wilder | A61G 7/1059 5/83.1 |
| 8,573,613 | B2 * | 11/2013 | Liu | A61H 3/04 16/21 |
| 9,254,232 | B2 | 2/2016 | Hjort et al. | |
| D902,791 | S * | 11/2020 | Fellingham | D12/130 |
| 11,197,792 | B1 * | 12/2021 | Inkmann | A61G 5/14 |
| 2003/0011228 | A1 * | 1/2003 | Komura | A61G 7/1074 297/344.12 |
| 2004/0189071 | A1 | 9/2004 | Komura et al. | |
| 2005/0086730 | A1 | 4/2005 | Terzo | |
| 2005/0288157 | A1 * | 12/2005 | Santos-Munne | A61H 1/0292 482/68 |
| 2007/0173380 | A1 * | 7/2007 | Gabel | A61G 5/14 482/52 |
| 2009/0144895 | A1 * | 6/2009 | Bostelman | A61G 7/109 5/87.1 |
| 2010/0222716 | A1 * | 9/2010 | Olsen | A63B 21/00178 601/26 |
| 2012/0104710 | A1 * | 5/2012 | Liu | A61H 3/04 280/42 |
| 2013/0319775 | A1 * | 12/2013 | Ngoh | A61G 7/1013 177/1 |
| 2015/0008049 | A1 | 1/2015 | Dixon et al. | |
| 2015/0139756 | A1 | 5/2015 | Yamamoto et al. | |
| 2016/0296409 | A1 * | 10/2016 | Schraudolph | A61H 3/04 |
| 2016/0331610 | A1 * | 11/2016 | Brown | A61G 5/14 |
| 2017/0066462 | A1 * | 3/2017 | Wright | A61G 7/1019 |
| 2017/0128299 | A1 | 5/2017 | Tsusaka et al. | |
| 2017/0209319 | A1 * | 7/2017 | Fawcett | A61G 5/125 |
| 2020/0230004 | A1 | 7/2020 | Kailasuo et al. | |
| 2021/0059891 | A1 * | 3/2021 | Raja | B62D 51/04 |
| 2021/0061396 | A1 * | 3/2021 | Wada | A61G 5/0833 |
| 2021/0137770 | A1 * | 5/2021 | Viljanmaa | A61H 3/04 |
| 2021/0154065 | A1 * | 5/2021 | Brown | A61H 3/04 |
| 2022/0047440 | A1 * | 2/2022 | Löcker | A61H 1/02 |
| 2022/0313510 | A1 * | 10/2022 | Shenhod Malihi | A61G 5/12 |
| 2023/0121597 | A1 * | 4/2023 | Lamb | A61G 5/1027 135/67 |

FOREIGN PATENT DOCUMENTS

| | | | |
|---|---|---|---|
| CN | 202619003 | U | 12/2012 |
| CN | 203341956 | U | 12/2013 |
| CN | 103655090 | A | 3/2014 |
| CN | 203790162 | U | 8/2014 |
| CN | 203852050 | U | 10/2014 |
| CN | 104649202 | A | 5/2015 |
| CN | 204683071 | U | 10/2015 |
| CN | 205391269 | U | 7/2016 |
| CN | 106456425 | A | 2/2017 |
| CN | 106618947 | A | 5/2017 |
| CN | 206560565 | U | 10/2017 |
| CN | 206852719 | U | 1/2018 |
| CN | 107669434 | A | 2/2018 |
| CN | 207722023 | U | 8/2018 |
| CN | 111031991 | A | 4/2020 |
| DE | 29500755 | U1 | 3/1995 |
| DE | 10227273 | A1 | 1/2004 |
| DE | 102004029513 | | 9/2005 |
| DE | 202007010738 | U1 | 10/2007 |
| DE | 102011052839 | A1 | 2/2013 |
| DE | 102015118955 | A1 | 5/2017 |
| EP | 1275363 | B1 | 8/2007 |
| IN | 206183508 | U | 5/2017 |
| TW | 449469 | B | 8/2001 |
| TW | M315056 | U | 7/2007 |
| WO | 03079953 | A2 | 10/2003 |
| WO | 2012059806 | A1 | 5/2012 |

* cited by examiner

DEVICE FOR SUPPORTING THE ABILITY OF A PERSON WITH RESTRICTED MOBILITY TO MOVE

TECHNICAL FIELD

The disclosure relates to a device that supports the ability of a person with restricted mobility to move.

BACKGROUND

The so-called patient mobilization is part of the daily therapy applications and treatments in nursing and patient care in hospitals, in nursing care for elderly and disabled persons, as well as in the field of rehabilitation. In order to be able to carry out the physiotherapy movement exercises, cardiovascular training, and breathing training that are necessary for patient mobilization, patients must often be mobilized from a lying position in the patient's bed to the sitting position before they can be brought into a standing position. Particular attention must be paid to the safety of the patient, as the often weakened, injured or otherwise disabled patients cannot get into a standing position on their own.

In the simplest case, people with walking difficulties who suffer from genetic or accident-related walking difficulties use a support device, such as a cane, a crutch, or a walker, to support or relieve the musculoskeletal system, insofar as the degree of mobility allows and at the same time to keep the balance.

For people or individuals who have had an accident and who require medically selected rehabilitation measures in order to regain their own mobility, only a small number of devices that support mobility in an upright position are available, which are primarily used for the purposes of rehabilitation measures.

DE 10 2004 029 513 B3 discloses a device that supports the autonomous ability of a person with restricted mobility to move. The known device is characterized in that a means can be applied to the joint area of the foot, the knee and the hip of the person, by means of which the respective joint area can be fixed and pivoted about at least one joint axis. In addition, a support unit can be placed on the upper body of the person, which supports them to ensure an upright posture. At least one actuator is provided on each of the means mentioned above, which deflects the respective joint area while applying a torque on the joint area. In addition, a sensor system is provided that detects the state of movement and rest of the person and generates sensor signals, which can be transmitted to a control unit. In addition, an input unit is provided through which control command signals can be input and transmitted to the control unit. Based on the sensor signals, the control unit generates control command signals and control signals which are used to control the actuators.

SUMMARY

An object of the present disclosure is to provide a device that supports the ability to move independently, which allows a patient with restricted mobility to be mobilized with the support of a caregiver.

This object is achieved by the device as claimed.

Bedridden patients should be mobilized again as early as possible in order to effectively promote their participation, to shorten ventilation times, to accelerate the recovery of everyday functions, as well as, in the sense of early mobilization, to prevent negative effects of immobility such as pulmonary, dermatological, neuromuscular, psychiatric and cognitive complications.

The patient therefore benefits in two ways from using the device to support self-mobility: The negative effects of immobility listed above are reduced. Starting patient mobilization as early as possible has a positive, healing effect on the patient's wakefulness and engagement, shorter ventilation times, and faster regaining of independence. In addition, the patient's recovery process is optimally supported by early mobilization opportunity. Thus, the risk of complications arising from a patient being bedridden and immobile is significantly reduced.

The novel device has a clear design, is easy-to-use by the caregivers and supports the patient's own use, while at the same time being laterally supported by the device so that he cannot fall.

The device provides technical assistance to enable a patient to be mobilized from the edge of the bed. The device—hereinafter also referred to as mobility assistant—can therefore be used both for the outpatient department and for early mobilization for long-term care in nursing homes, institutions for the disabled and in-home care settings. The mobility assistant can also be used in narrow patient rooms by utilizing the space efficiently, since the armrests of the mobility assistant are provided to pull the patient from their position on the edge of the bed to a position in which he can begin an assisted walking movement without fear of falling.

With these possible uses, the mobility assistant helps to strengthen the muscles of the musculoskeletal system, to improve cardiovascular training, to improve breathing training, for pneumonia prophylaxis, i.e., to prevent pneumonia, to strengthen the perception of a patient, to change the visual environment, to train a physiologically desirable sitting position, to shorten the stay in an intensive care unit, or the total hospital stay. The elimination of the need to transfer the patient out of bed through many movements, as well as the presence of supports and retaining straps, improve the safety of the patient. The mobilization of those in need of care is also made possible. The individual adaptability to the patient's anatomical conditions ensures the best possible usability for all patients.

The workload of the caregiver is greatly reduced. Because there is no transfer from bed, the incidence of dislocations of the venous access, drainage, tubes and other drains is reduced.

One embodiment is particularly advantageous, according to which the armrests and the backrest on which the patient is supported or against which he leans with his back are fixed laterally offset relative to the mast of the trolley and are connected to the trolley via at least one support arm. With this configuration of the mobility assistant, the freedom of movement of the model is increased compared to the model described above. This model can easily be pushed to the side of the patient's bed.

It is also advantageous that in this embodiment the mobility assistant has a lateral torque support, which is arranged essentially under the backrest and under the armrests and which is connected or can be connected to the trolley, for example in the form of at least one additional arm that is arranged essentially below the support arm. The center of gravity of the holding means which supports the patient, i.e., the armrests and the backrest, is here immediately above the point on which the torque support is supported relative to the ground. It is preferably provided that the torque support is also installed via at least one roller and can be moved together with the trolley.

It is particularly advantageous if the backrest also has at least one positioning means to enable the adjustment or change of an inclination of the upper body that is adapted to the patient.

Furthermore, the armrests are preferably each equipped with at least one positioning means.

In particular, the armrests are advantageously arranged to be pivotable and/or height-adjustable relative to the mast or to the bracket which supports them.

Preferably, the armrests can be adjusted in length.

In order to achieve an optimal adjustment to the individual arm length of the patient, it can be provided that the arm rests, each divided in two in the longitudinal direction, are designed as an upper arm support and a forearm support for the separate support of the patient's upper and forearm, wherein the upper arm support and the forearm support are each connected via pivot and swivel joints and are each individually adjustable in length.

Advantageously, instead of a mechanical drive for the backrest, and/or the armrests, a motorized drive can be provided for pivoting, rotating and/or lifting movements in all spatial directions for the mobilization of the patient. The adjustment of the positions of the backrest, the armrests and/or the headrest by the caregiver can be easily monitored from a control panel arranged for example on the mast of the mobility assistant.

To increase the comfort of the patient or to place objects, such as a drinking vessel, at least one of the armrests can be equipped with a tray at its front end. The tray is also only suitable for resting one hand of the patient; a foldable design of the tray is also advantageous.

A vertical support can also advantageously be attached to the at least one tray, which can be held by the patient's hand.

In particular, a positioning means or a control stick, which can be operated by the patient and/or a caregiver, can be arranged on the tray for setting the backrest, the armrests, etc., of the patient.

Preferably, the mobility assistant comprises a headrest, which is arranged in such a way as to be adjustable in height and/or inclination, especially with respect to the backrest.

To facilitate operation by the caregiver, operating means, in particular a control keyboard, for the motorized adjustment of the armrests and/or of the backrest are arranged on the trolley. This can be part of a computer that is adapted especially to the intranet of a hospital, a care unit, etc. and is especially integrated into the mobility assistant.

It is also advantageous if a monitor is arranged on the trolley for displaying settings made on the trolley, patient data and other information. With a digital online connection and, for example, with a special application software, many functions can be implemented such as localizing the mobility assistant's whereabouts, the current use of the mobility assistant, the display of maintenance work and intervals, automatic recording of operating data, error data, statistical analyzes of operating data relating to the device, the ward, the caregiver, etc.

Through a lifting aid function for a bedridden patient that can be implemented with the mobility assistant, care work can be carried out by a single caregiver that would otherwise require at least two caregivers. The lifting aid function is preferably best implemented when the backrest and armrests are lifted together, so that the patient is gradually lifted from a seated position to a standing position.

If push handles are attached to the trolley, i.e., preferably to the mast of the mobility assistant, for movement or to control and support a motorized movement of the trolley, the assistant can be easily moved by the caregiver. A brake is preferably also provided on the trolley, especially a brake that can be operated by foot and is attached directly to at least one of the rollers.

Due to the ease of use, using the mobility assistant also prevents the caregivers from developing back problems since the patients no longer need to be lifted by the caregiver.

Furthermore, a belt system is preferably attached to the mobility assistant, by which the patient is secured.

BRIEF DESCRIPTION OF THE DRAWINGS

The mobility assistant is explained in more detail below in exemplary embodiments with reference to drawings.

DETAILED DESCRIPTION

Figure 1:
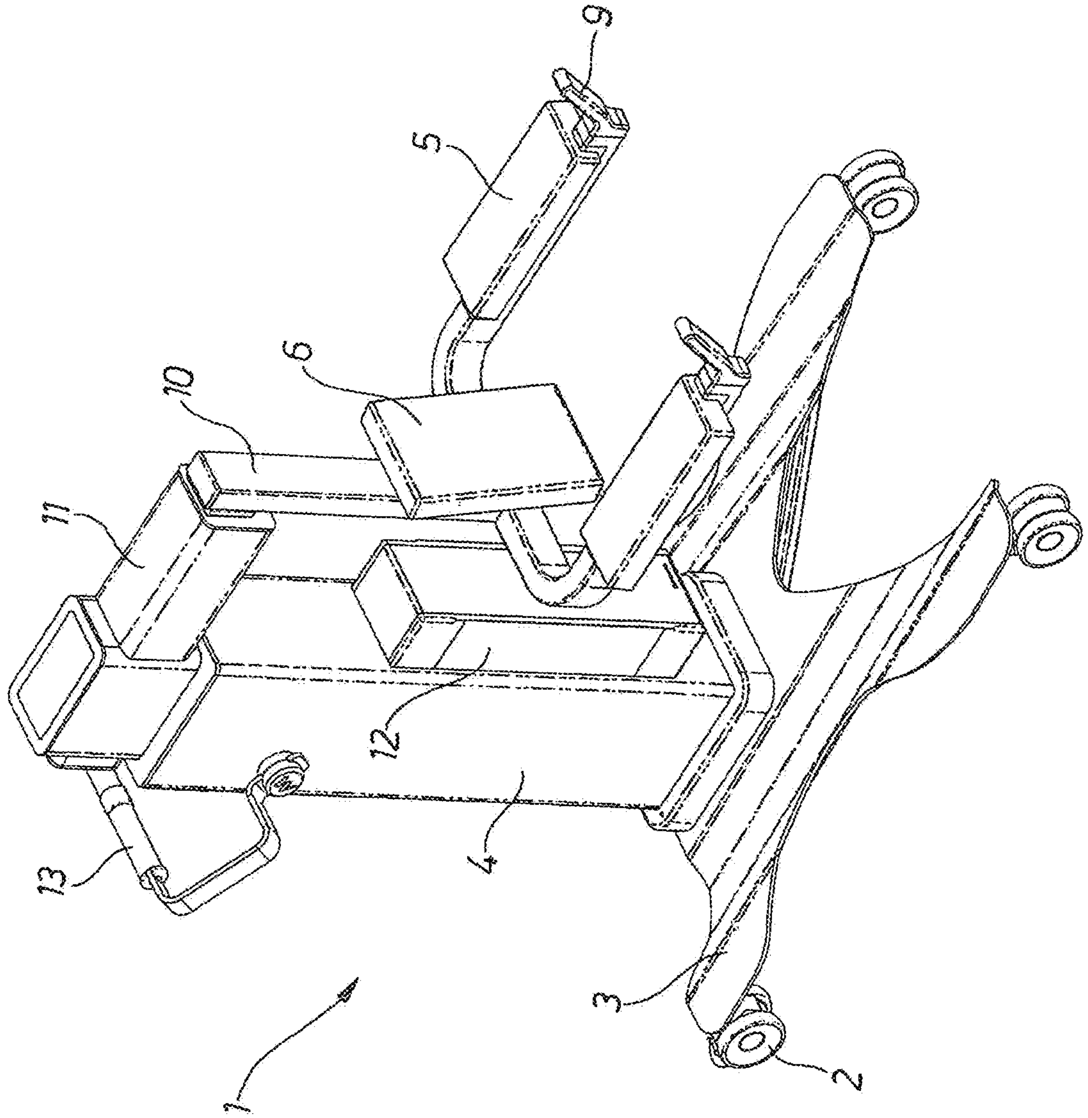
FIG. 1 shows a perspective view of a first mobility assistant.
Figure 3:
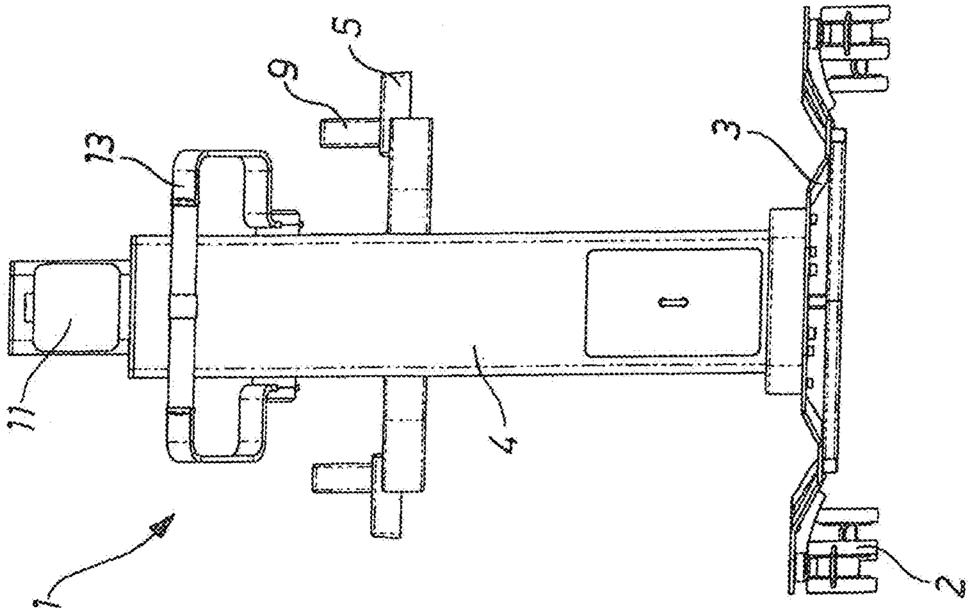
FIG. 3 shows the mobility assistant according to FIG. 1 in a view from the rear.
Figure 2:
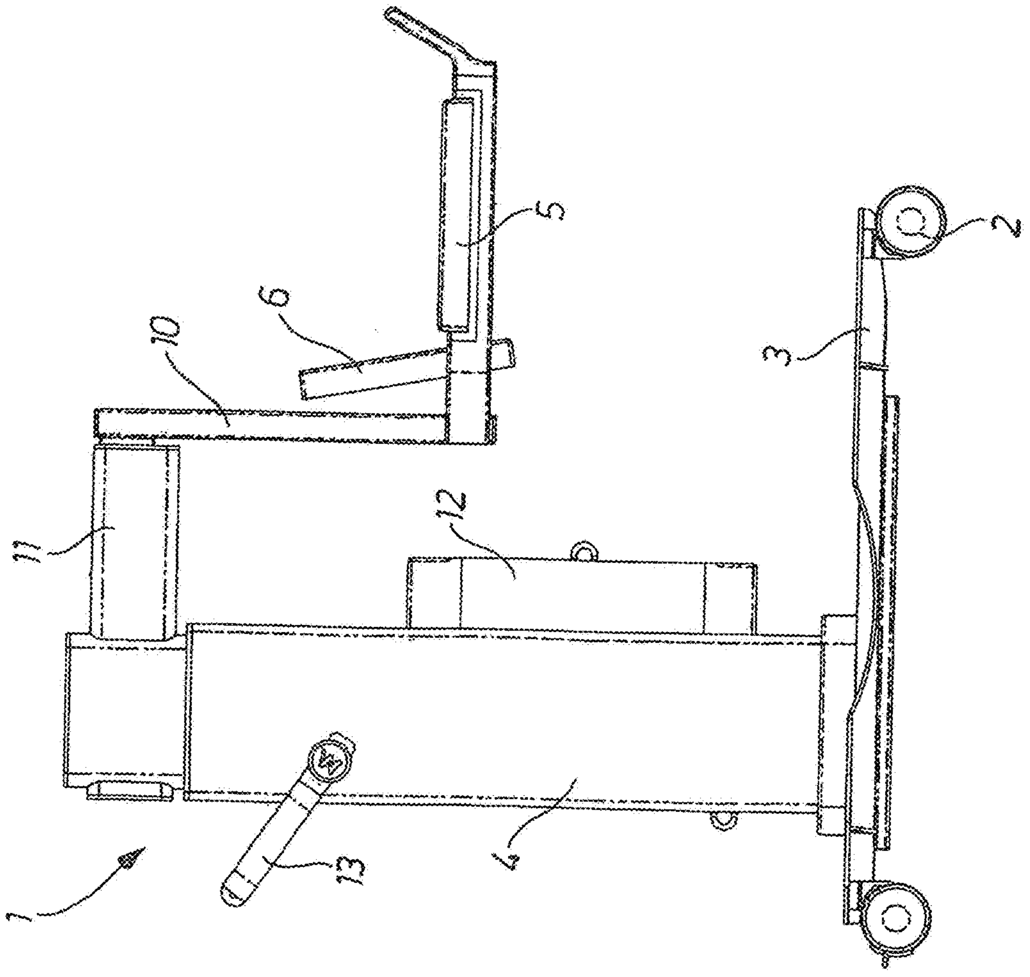
FIG. 2 shows the mobility assistant according to FIG. 1 in a side view.
Figure 5:
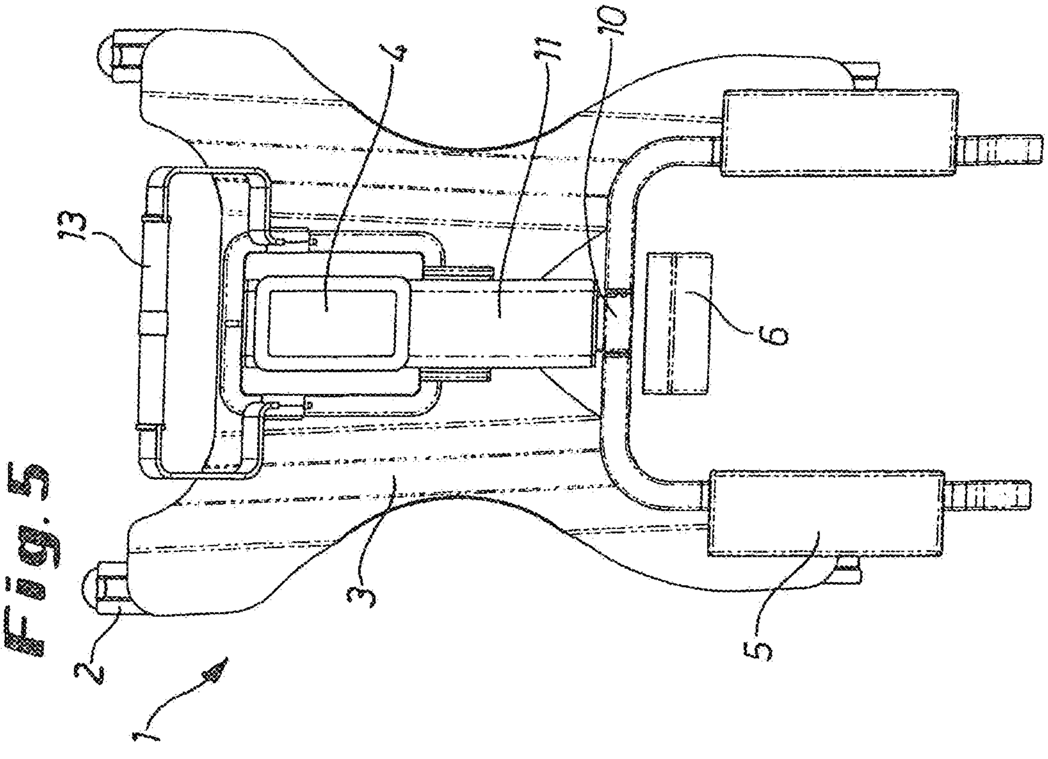
FIG. 5 shows the mobility assistant according to FIG. 1 in top view.
Figure 4:
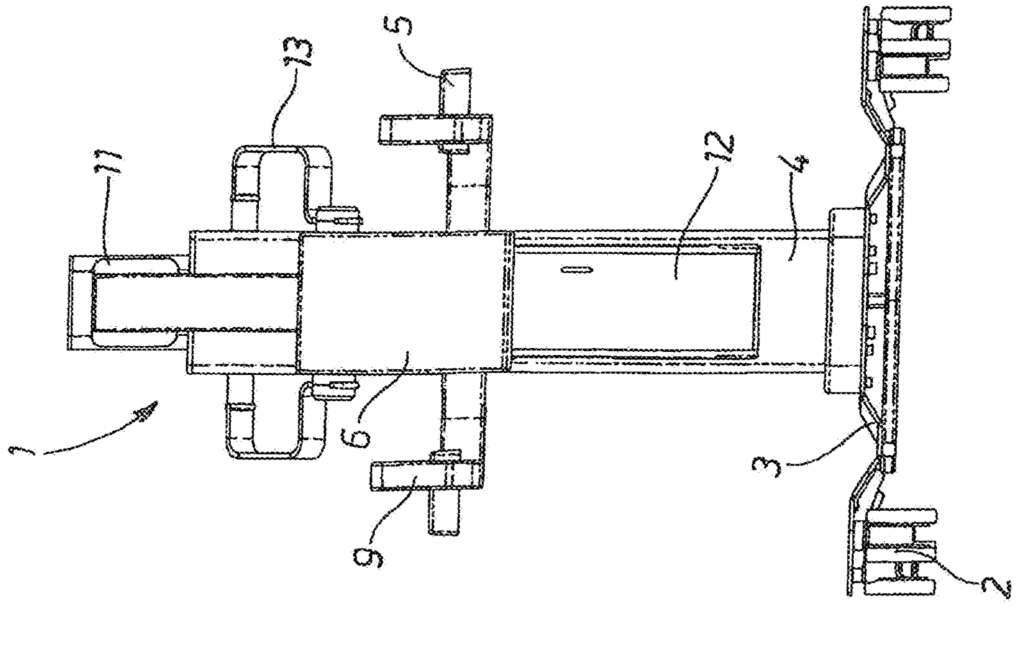
FIG. 4 shows the mobility assistant according to FIG. 1 in a view from the front.

A device that supports the ability of a person with restricted mobility to move, i.e., a mobility assistant 1 (FIGS. 1 to 5) comprises a roller frame or a trolley 3 mounted on rollers 2. A backrest 6, and armrests 5 are attached to the front of a mast 4. On the front of the armrests 5 holding or support or operating handles 9 are attached, which can be used to enable the patient to adjust individual positions of the backrest 6, the armrests 5 etc. if the adjustability function has been released for the patient by the caregiver. The backrest 6 and the armrests 5 are connected to the mast 4 via a vertical retaining strut 10 and a horizontal retaining strut 11. The backrest 6 is preferably motorized and adjustable in height relative to the mast 4. Operating means (not shown), a monitor and the like are preferably accommodated on the mast 4 or in a separate housing 12 attached to the mast 4. The mobility assistant 1 can be moved or rotated by a push handle 13, wherein these movements are preferably supported by a motor.

Figure 6:
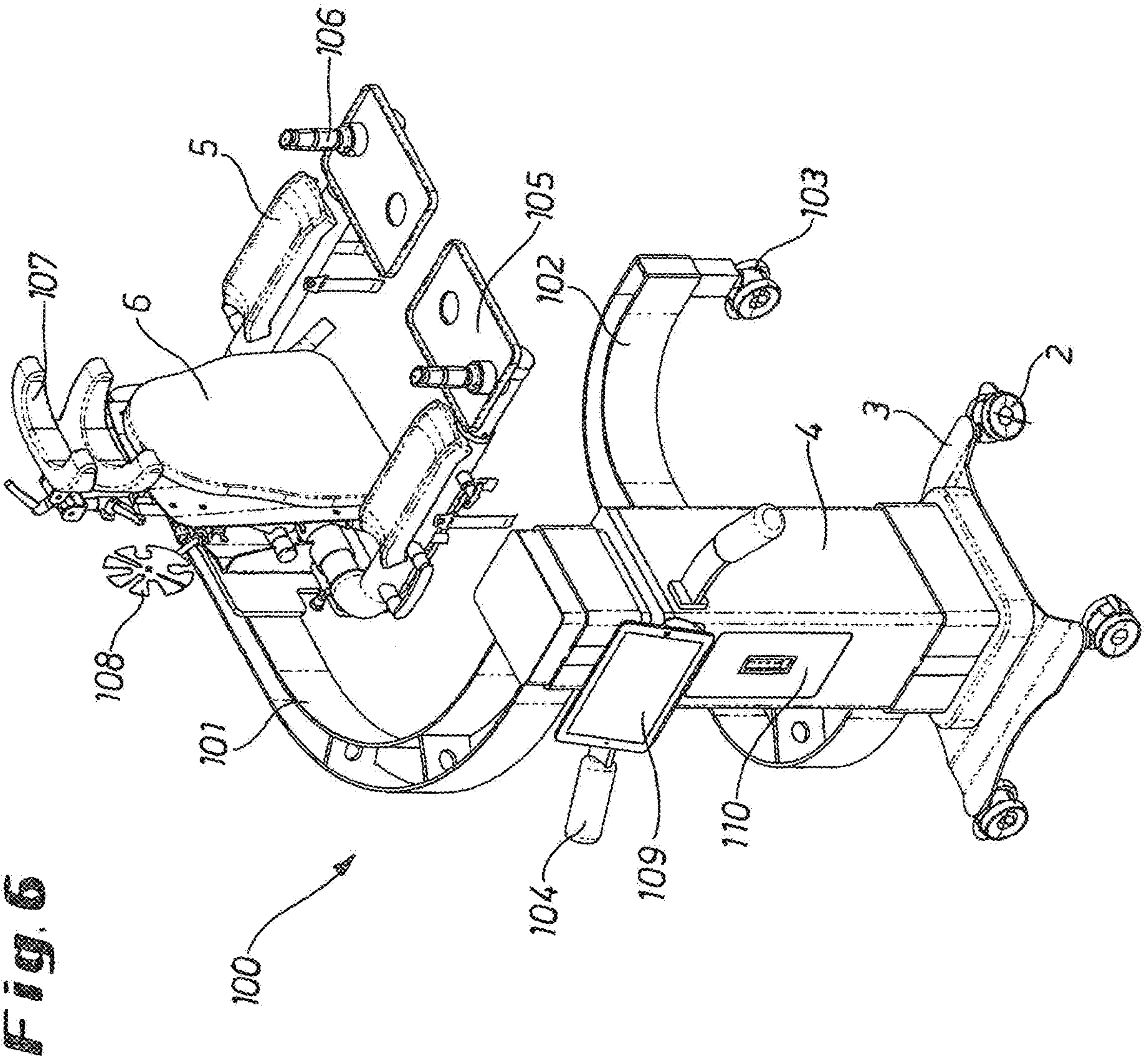
FIG. 6 shows a perspective view of a second mobility assistant.
Figure 8:
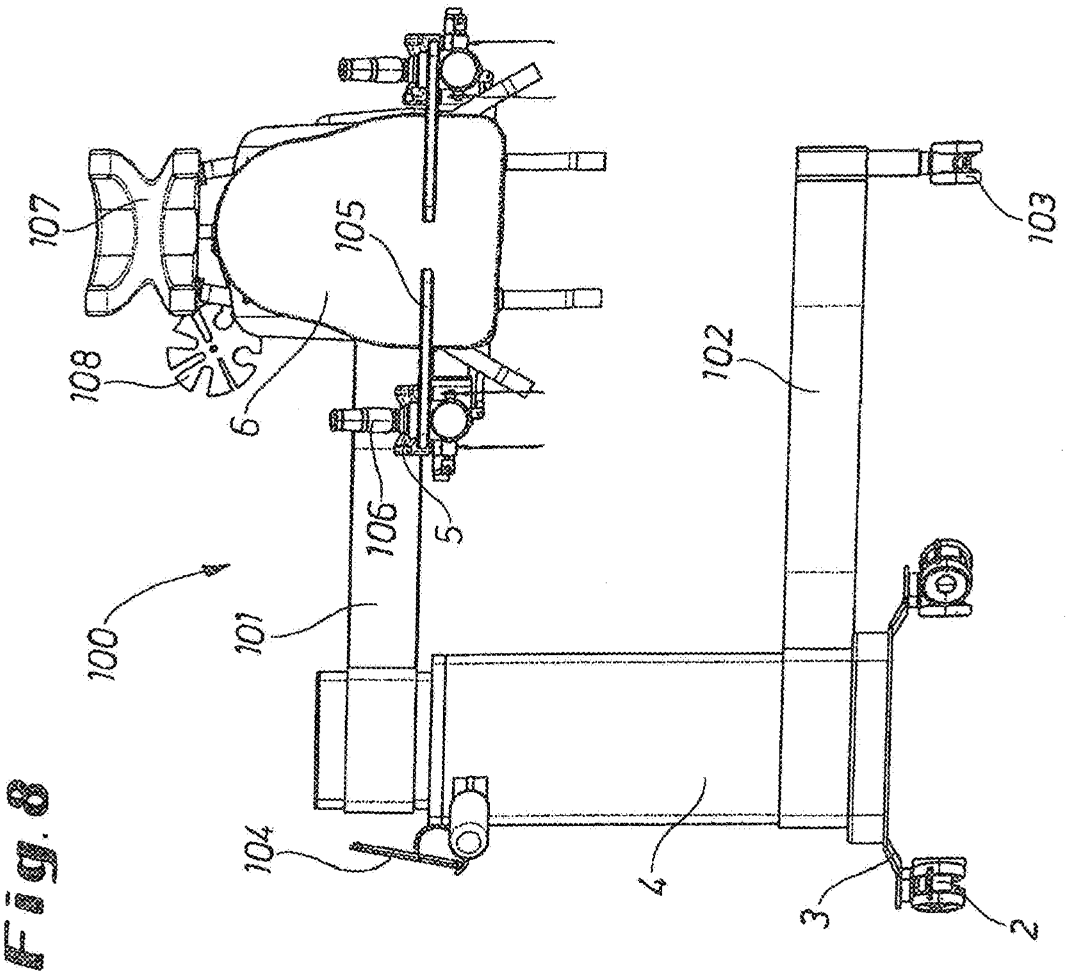
FIG. 8 shows the mobility assistant according to FIG. 6 in a view from the front.
Figure 7:
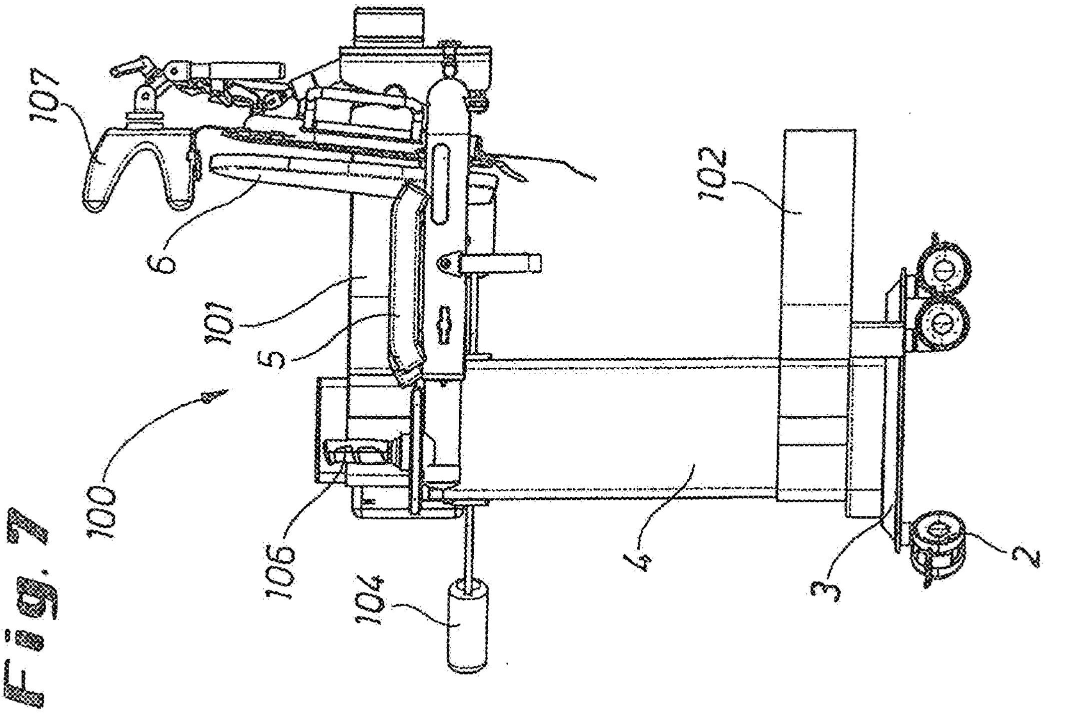
FIG. 7 shows the mobility assistant according to FIG. 6 in a side view.
Figure 10:
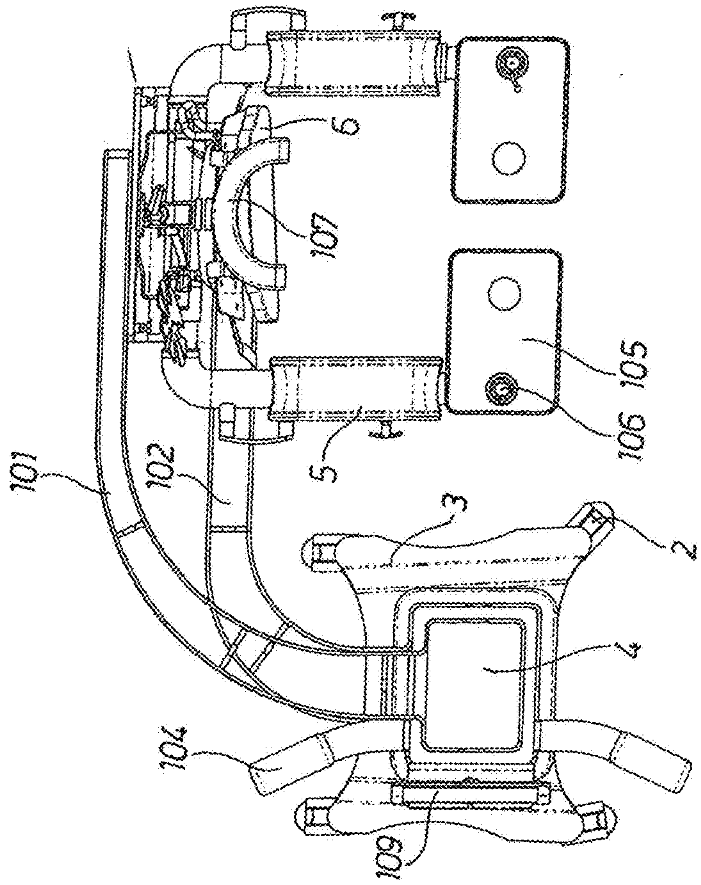
FIG. 10 shows the mobility assistant according to FIG. 6 in a top view.
Figure 9:
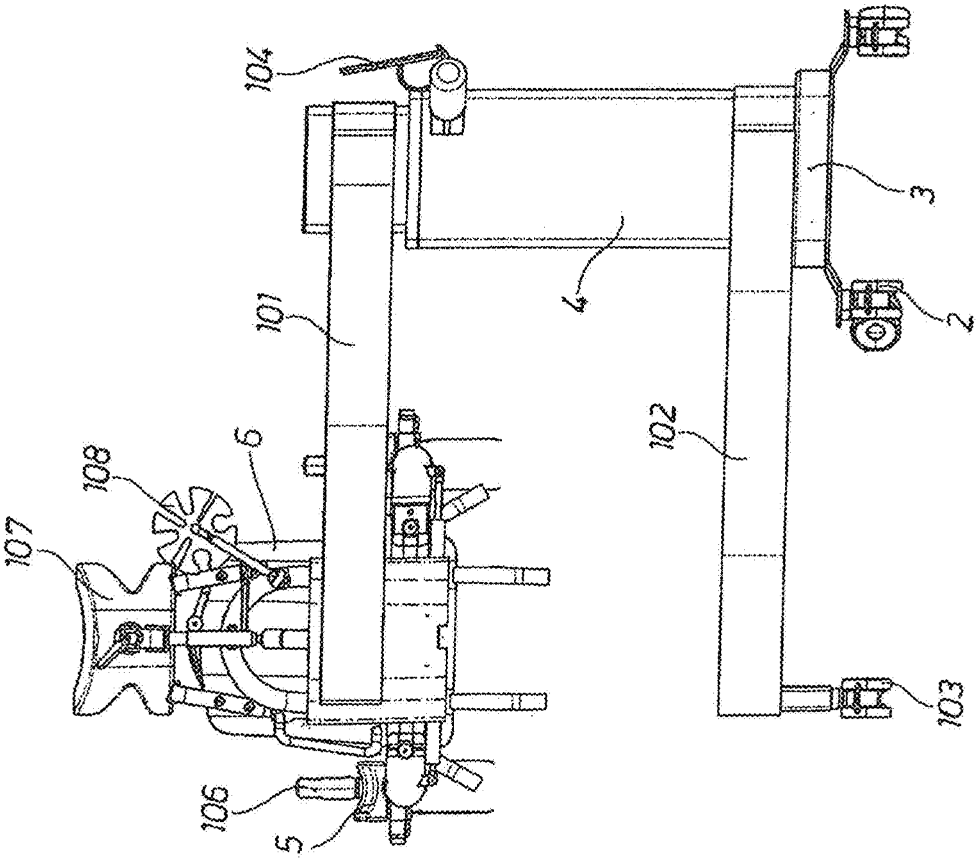
FIG. 9 shows the mobility assistant according to FIG. 6 in a view from the rear.

Insofar as a second mobility assistant 100 (FIGS. 6 to 10) comprises the same components as the mobility assistant 1, these are provided with the same reference symbols.

The mobility assistant 100 further comprises a lateral support arm 101 which carries the armrests 5 and the backrest 6, which are arranged and height-adjustable, either relative to the support arm 101, or together with the support arm 101 relative to the mast 4 of the mobility assistant. It can also be provided that the support arm 101 can be pivoted relative to the mast 4 over a certain range, for example by 10°. All relative movements of the support arm 101 with respect to the mast 4 are realized by a motor, for example, by a motor arranged in the interior of the mast 4.

The support arm 101, with the armrests 5 and the backrest 6 which are attached to it, generates a lateral torque with respect to the trolley 3 and to the mast 4. This torque is absorbed by a torque support 102, which is firmly connected to the roller frame or trolley 3 and is supported on the floor via a roller 103, so that the mobility assistant 100 as a whole is movable in the plane, wherein the mobility is being supported by side handles 104 that are attached to the mast 4. The roller 103 is preferably attached under the center of gravity of the unit formed by the armrests 5, the backrest 6 and the support arm 101, so that when the armrests 5 and the backrest 6 are loaded by a patient of average weight, no lateral torque acts on the mast 4.

On the front side of the armrests 5, a tray 105, which can preferably be pivoted or folded away, is provided so that one hand of the patient can rest on it. A control stick 106 that can be held by one hand is preferably attached to each of the trays 105, which is used, for example as a joystick, to operate the mobility assistant by the caregiver or—after appropriate approval—by the patient.

To increase comfort, a swivel and/or height-adjustable headrest 107 is located above the backrest 6. In the area behind the backrest 6, there is a guide means 108 for guiding supply hoses, cables, and the like for supplying the patient or for recording patient data.

A monitor 109 is provided on the mast 4 to display data from the patient, the mobility assistant 100 and other messages. An input keyboard, further input means such as a computer mouse and the like are preferably also provided in the area of the mast 4, wherein the input keyboard can be arranged on a panel 110 which can preferably be pivoted and arranged with respect to the mast 4.

Both in the mobility assistant 1 and in the mobility assistant 100, retaining straps are preferably provided with which the patient is secured relative to the backrest 6 so that he does not injure himself or fall out of the lateral borders by the armrests 5.

The invention claimed is:

1. A device (1, 100) for supporting the ability of a person with restricted mobility to move, comprising:
a trolley (3);
a mast (4) attached to the trolley (3); and
a backrest (6) and armrests (5) attached to the mast (4) and configured for receiving the person,
wherein each of the armrests (5) comprises at least one positioning means, and
wherein the armrests (5) are each longitudinally split into
an upper arm support and
a forearm support
to separately support the person's upper and forearm,
wherein the upper arm support and the forearm support are each connected via pivot and swivel joints and are each individually adjustable in length.

2. The device (100) according to claim 1,
wherein the backrest (6) and the armrests (5) are attached laterally offset with respect to the mast (4) and connected to the trolley (3) via at least one support arm (101).

3. The device (100) according to claim 1,
further comprising a lateral torque support (102) which is arranged essentially under the backrest (6) and the armrests (5) and which is connected to the trolley (3).

4. The device (100) according to claim 3,
wherein the lateral torque support (102) is supported by at least one roller (103) and can be moved with the trolley.

5. The device (1, 100) according to claim 1,
wherein the backrest (6) comprises at least one positioning means.

6. The device (1, 100) according to claim 5,
wherein the backrest (6) is arranged in a pivoting manner and/or adjustable in height relative to the mast.

7. The device (1, 100) according to claim 1,
wherein the armrests (5) are arranged pivotably and/or height-adjustable with respect to the backrest (6).

8. The device (1, 100) according to claim 1,
wherein the armrests (5) are adjustable in length.

9. The device (1, 100) according to claim 1,
wherein the backrest (6) and/or the armrests (5) are each equipped with a motor drive for pivoting, rotating and/or lifting movements in all spatial directions, to mobilize the person.

10. The device (1, 100) according to claim 1,
wherein at least one of the armrests (5) is equipped at its front end with a tray (105) for supporting a hand of the person and/or an object, the tray (105) being capable of being folded down.

11. The device (1, 100) according to claim 10,
wherein a vertical support is attached to the tray and configured to be held by the hand of the person.

12. The device (1, 100) according to claim 10,
wherein a positioning means that can be operated by the person and/or a caregiver or a control stick (106) for setting a sitting position of the person is arranged on the tray (105).

13. The device (1, 100) according to claim 1,
wherein a headrest (107) is attached above the backrest (6), which is arranged adjustable in height and/or inclination with respect to the backrest (6).

14. The device (1, 100) according to claim 13,
wherein a control keyboard for motorized adjustment of the armrests (5), of the backrest (6) and/or of the headrest (107) are arranged.

15. The device (1, 100) according to claim 1,
wherein a monitor (109) is arranged on the trolley (3) to display settings made on the trolley, patient data and other information.

16. The device (1, 100) according to claim 1,
wherein push handles (13, 104) are attached on the mast (4) for moving the trolley (3) or for controlling and supporting a motorized movement of the trolley (3).

17. The device (1, 100) according to claim 1,
wherein the trolley (3) is equipped with a brake.

* * * * *